(12) United States Patent
Tu et al.

(10) Patent No.: US 8,904,544 B2
(45) Date of Patent: Dec. 2, 2014

(54) RESTRICTIONS TO DATA TRANSMISSION

(75) Inventors: Van Quy Tu, Kitchener (CA); Adrian Michael Logan, Milton (CA); Andrew John Ewanchuk, Baden (CA); Imtiaz Nadaf, Andover, MA (US)

(73) Assignee: BlackBerry Limited, Waterloo (CA)

( * ) Notice: Subject to any disclaimer, the term of this patent is extended or adjusted under 35 U.S.C. 154(b) by 21 days.

(21) Appl. No.: 13/085,685

(22) Filed: Apr. 13, 2011

(65) Prior Publication Data
US 2012/0110675 A1 May 3, 2012

Related U.S. Application Data

(60) Provisional application No. 61/408,992, filed on Nov. 1, 2010.

(51) Int. Cl.
*G06F 7/04* (2006.01)
*H04L 29/06* (2006.01)
*G06F 12/14* (2006.01)
*G06F 15/16* (2006.01)
*G06F 3/048* (2013.01)
*G06F 21/62* (2013.01)
*G06F 21/51* (2013.01)
*G11B 20/00* (2006.01)
*G06F 21/12* (2013.01)
*G06F 17/24* (2006.01)
*G06F 9/54* (2006.01)
*G06F 21/64* (2013.01)
*H04L 12/58* (2006.01)
*H04W 12/08* (2009.01)
*H04W 4/12* (2009.01)

(52) U.S. Cl.
CPC ............ *H04L 63/10* (2013.01); *G06F 21/6245* (2013.01); *G06F 21/51* (2013.01); *G11B 20/00086* (2013.01); *G06F 21/128* (2013.01); *G06F 21/6227* (2013.01); *G06F 17/24* (2013.01); *G06F 9/543* (2013.01); *G06F 21/64* (2013.01); *H04L 12/5855* (2013.01); *H04L 12/5895* (2013.01); *H04L 51/14* (2013.01); *H04L 51/38* (2013.01); *H04W 4/12* (2013.01); *H04W 12/08* (2013.01)
USPC ............. 726/26; 713/165; 713/187; 709/246; 715/770

(58) Field of Classification Search
CPC ....... G06F 21/128; G06F 9/543; G06F 17/24; G06F 21/6227; G06F 21/6245; G06F 21/64; G06F 21/51; G11B 20/00086; H04L 29/08099
USPC ..................... 726/26; 713/165, 187; 709/246; 715/770
See application file for complete search history.

(56) References Cited

U.S. PATENT DOCUMENTS

2003/0233410 A1 12/2003 Gusler
(Continued)

OTHER PUBLICATIONS

View messages with restricted permission sent by using IRM; Support/Outlook/Outlook 2007 Help and How-to. http://office.microsoft.com/en-us/outlook-help/view-messages-withrestricted-permission-sent-by-using-irm-HA010246115. as . . . , pp. 1-2, retrieved on Feb. 12, 2010.

(Continued)

*Primary Examiner* — Aravind Moorthy
(74) *Attorney, Agent, or Firm* — Novak Druce Connolly Bove + Quigg LLP (57) ABSTRACT

Data received at, or created on, a device may be tagged as corporate dependent upon a service over which the data is received or an application in which the data is created. When a user attempts to insert tagged data into a data item that is to be transmitted by the device, the insertion may be prevented. Similarly, the transmission of tagged data may be restricted to only occur on a secure service.

9 Claims, 5 Drawing Sheets

(56) References Cited

U.S. PATENT DOCUMENTS

| | | |
|---|---|---|
| 2004/0260710 A1 | 12/2004 | Marston |
| 2007/0019643 A1* | 1/2007 | Shaheen ............... 370/389 |
| 2008/0002726 A1* | 1/2008 | Haung et al. ............ 370/401 |
| 2008/0098237 A1* | 4/2008 | Dung et al. ............. 713/189 |
| 2008/0125146 A1* | 5/2008 | Bainbridge ............. 455/466 |
| 2009/0031393 A1 | 1/2009 | Denner |
| 2009/0094668 A1* | 4/2009 | Corbin et al. ............ 726/1 |
| 2010/0088753 A1* | 4/2010 | Ayres et al. ............. 726/9 |
| 2010/0299394 A1* | 11/2010 | Jania et al. ............. 709/206 |
| 2010/0325221 A1* | 12/2010 | Cohen et al. ........... 709/206 |
| 2010/0325430 A1* | 12/2010 | Denninghoff ........... 713/160 |

OTHER PUBLICATIONS

Send an e-mail message with restricted permission by using IRM; Support/Outlook/Outlook 2007 Help and Hot-to. http://office.microsoft.com/en-us/outlook/help/send-an-e-mail-message-with-restricted-permission-by-using-irm-HA01024780 . . . , pp. 1-4, retrieved on Feb. 12, 2010.

Introduction to using IRM for e-mail messages; Support/Outlook/Outlook 2007 Help and How-to. http://office.microsoft.com/en-us/outlook-help/introduction-to-using-irm-for-e-mail-message-HA010100366.aspx?CTT=5&or . . . , pp. 1-6, retrieved on Feb. 12, 2010.

Extended European Search Report mailed Mar. 17, 2014; in corresponding European patent application No. 11162178.5.

* cited by examiner

RESTRICTIONS TO DATA TRANSMISSION

CROSS-REFERENCE TO RELATED APPLICATIONS

The present application claims priority to U.S. Provisional Patent Application No. 61/408,992, filed Nov. 1, 2010, the contents of which are hereby incorporated herein by reference.

FIELD

The present application relates generally to data transmission and, more specifically, to applying restrictions to such transmission.

BACKGROUND

Increasingly, individuals are required by an employer to carry and utilize a mobile communication device capable of such communication as placing and receiving telephone calls as well as sending and receiving electronic messages including, for example, e-mail messages, short messaging service (SMS) messages, multimedia messaging service (MMS) messages, instant messaging messages, calendar event invitations, address book entries, etc. Furthermore, to assist in time management, such devices also execute a calendar application, and to assist in contact management, such devices also maintain a contact database.

Notably, rather than carry one device for corporate communication and a second device for personal communication, individuals are opting to manage both corporate and personal communication on a single device. A mixing of corporate and personal data that inevitably occurs on such devices may be seen as problematic for some corporate entities.

BRIEF DESCRIPTION OF THE DRAWINGS

Reference will now be made, by way of example, to the accompanying drawings which show example implementations; and in which.

DETAILED DESCRIPTION

Data received at, or created on, a device may be tagged as "corporate", with the tagging dependent upon a service over which the data is received or an application in which the data is created. When a user attempts to paste data tagged in this manner into a data item that is to be transmitted by the device, the transmission of the data may be restricted to only occur on a secure service.

According to an aspect of the present disclosure, there is provided a method of facilitating data protection. The method includes receiving an instruction to insert data into a data item, determining that a first service has been selected for transmission of the data item, determining that the data is associated with a second service and preventing insertion of the data into the data item. In other aspects of the present application, a processor is provided for carrying out this method and a computer readable medium is provided for adapting a processor to carry out this method.

According to a further aspect of the present disclosure, there is provided a method of facilitating data protection. The method includes receiving an instruction to transmit a data item, determining that a first service has been selected for transmission of the data item, determining that a portion of the data item is associated with a second service and preventing transmission of the data item. In other aspects of the present application, a processor is provided for carrying out this method and a computer readable medium is provided for adapting a processor to carry out this method.

Other aspects and features of the present disclosure will become apparent to those of ordinary skill in the art upon review of the following description of specific implementations of the disclosure in conjunction with the accompanying figures.

Figure 1:
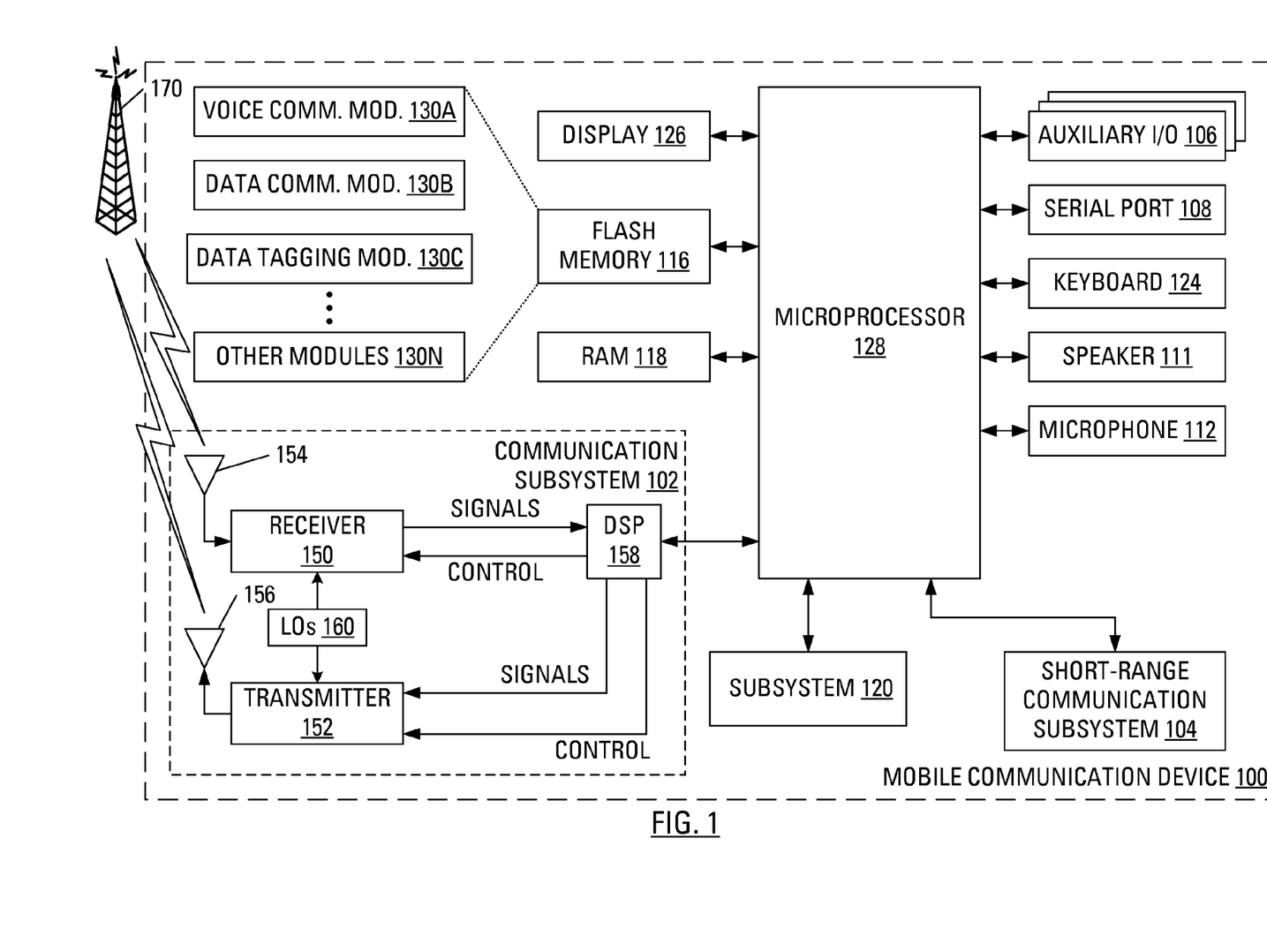
FIG. 1 illustrates a mobile communication device.

FIG. 1 illustrates a mobile communication device 100 as an example of a device that may be provided to users of a corporate network. The mobile communication device 100 includes a housing, an input device (e.g., a keyboard 124 having a plurality of keys) and an output device (e.g., a display 126), which may comprise a full graphic, or full color, Liquid Crystal Display (LCD). In some embodiments, the display 126 may comprise a touchscreen display. In such embodiments, the keyboard 124 may comprise a virtual keyboard. Other types of output devices may alternatively be utilized. A processing device (a microprocessor 128) is shown schematically in FIG. 1 as coupled between the keyboard 124 and the display 126. The microprocessor 128 controls the operation of the display 126, as well as the overall operation of the mobile communication device 100, in part, responsive to actuation of the keys on the keyboard 124 by a user.

The housing may be elongated vertically, or may take on other sizes and shapes (including clamshell housing structures). In the case in which the keyboard 124 includes keys that are associated with at least one alphabetic character and at least one numeric character, the keyboard 124 may include a mode selection key, or other hardware or software, for switching between alphabetic entry and numeric entry.

In addition to the microprocessor 128, other parts of the mobile communication device 100 are shown schematically in FIG. 1. These may include a communications subsystem 102, a short-range communications subsystem 104, the keyboard 124 and the display 126. The mobile communication device 100 may further include other input/output devices, such as a set of auxiliary I/O devices 106, a serial port 108, a speaker 111 and a microphone 112. The mobile communication device 100 may further include memory devices including a flash memory 116 and a Random Access Memory (RAM) 118 and various other device subsystems 120. The mobile communication device 100 may comprise a two-way radio frequency (RF) communication device having voice and data communication capabilities. In addition, the mobile communication device 100 may have the capability to communicate with other computer systems via the Internet.

Operating system software executed by the microprocessor 128 may be stored in a computer readable medium, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the mobile device may also be stored to the RAM 118.

The microprocessor 128, in addition to its operating system functions, enables execution of software applications on the mobile communication device 100. A predetermined set of software applications that control basic device operations, such as a voice communications module 130A and a data communications module 130B, may be installed on the mobile communication device 100 during manufacture. A data tagging module 130C may also be installed on the mobile communication device 100 during manufacture, to implement aspects of the present disclosure. As well, additional software modules, illustrated as an other software module 130N, which may be, for instance, a personal information manager (PIM) application, may be installed during manufacture. The PIM application may be capable of organizing and managing data items, such as e-mail messages, calendar events, voice mail messages, appointments, address book entries and task items. The PIM application may also be capable of sending and receiving data items via a wireless carrier network 170 represented by a radio tower. The data items managed by the PIM application may be seamlessly integrated, synchronized and updated via the wireless carrier network 170 with the device user's corresponding data items stored or associated with a host computer system.

Communication functions, including data and voice communications, are performed through the communication subsystem 102 and, possibly, through the short-range communications subsystem 104. The communication subsystem 102 includes a receiver 150, a transmitter 152 and one or more antennas, illustrated as a receive antenna 154 and a transmit antenna 156. In addition, the communication subsystem 102 also includes a processing module, such as a digital signal processor (DSP) 158, and local oscillators (LOs) 160. The specific design and implementation of the communication subsystem 102 is dependent upon the communication network in which the mobile communication device 100 is intended to operate. For example, the communication subsystem 102 of the mobile communication device 100 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), Enhanced Data rates for GSM Evolution (EDGE), Universal Mobile Telecommunications System (UMTS), Wideband Code Division Multiple Access (W-CDMA), High Speed Packet Access (HSPA), etc. Other types of data and voice networks, both separate and integrated, may also be utilized with the mobile communication device 100.

Network access requirements vary depending upon the type of communication system. Typically, an identifier is associated with each mobile device that uniquely identifies the mobile device or subscriber to which the mobile device has been assigned. The identifier is unique within a specific network or network technology. For example, in Mobitex™ networks, mobile devices are registered on the network using a Mobitex Access Number (MAN) associated with each device and in DataTAC™ networks, mobile devices are registered on the network using a Logical Link Identifier (LLI) associated with each device. In GPRS networks, however, network access is associated with a subscriber or user of a device. A GPRS device therefore uses a subscriber identity module, commonly referred to as a Subscriber Identity Module (SIM) card, in order to operate on a GPRS network. Despite identifying a subscriber by SIM, mobile devices within GSM/GPRS networks are uniquely identified using an International Mobile Equipment Identity (IMEI) number.

When required network registration or activation procedures have been completed, the mobile communication device 100 may send and receive communication signals over the wireless carrier network 170. Signals received from the wireless carrier network 170 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the wireless carrier network 170 are processed (e.g., modulated and encoded) by the DSP 158 and are then provided to the transmitter 152 for digital to analog conversion, frequency up conversion, filtering, amplification and transmission to the wireless carrier network 170 (or networks) via the transmit antenna 156.

In addition to processing communication signals, the DSP 158 provides for control of the receiver 150 and the transmitter 152. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 102 and is input to the microprocessor 128. The received signal is then further processed by the microprocessor 128 for output to the display 126, or alternatively to some auxiliary I/O devices 106. A device user may also compose data items, such as e-mail messages, using the keyboard 124 and/or some other auxiliary I/O device 106, such as a touchpad, a rocker switch, a thumb-wheel, a trackball, a touchscreen, or some other type of input device. The composed data items may then be transmitted over the wireless carrier network 170 via the communication subsystem 102.

In a voice communication mode, overall operation of the device is substantially similar to the data communication mode, except that received signals are output to the speaker 111, and signals for transmission are generated by a microphone 112. Alternative voice or audio I/O subsystems, such as a voice message recording subsystem, may also be implemented on the mobile communication device 100. In addition, the display 126 may also be utilized in voice communication mode, for example, to display the identity of a calling party, the duration of a voice call, or other voice call related information.

The short-range communications subsystem 104 enables communication between the mobile communication device 100 and other proximate systems or devices, which need not necessarily be similar devices. For example, the short-range communications subsystem may include an infrared device and associated circuits and components, or a Bluetooth™ communication module to provide for communication with similarly-enabled systems and devices.

It may be the case that a corporation wants to force users to use corporate resources for corporate activity. For a first example, a corporation may wish to require that a corporate e-mail message be sent using the corporate mail service, e.g., sent with a corporate e-mail address as the "From" address and using a corporate e-mail server. For a second example, a corporation may wish to require that a corporate calendar invitation be sent using the corporate mail service. By requiring that corporate resources be used for corporate activity, the corporation can be seen to be taking steps to prevent accidental leakage of corporate data via communication channels over which the corporation has no control. A corporation may, by forcing users to use corporate resources for corporate activity, maintain a system wherein such corporate activity may be tracked and audited.

In overview, it is proposed herein to transmit a policy to the mobile communication device 100. The policy establishes rules for the mobile communication device 100. The rules may include a rule that restricts transmission of corporate data such that the transmission may only use secure corporate channels.

During the course of normal use of the mobile communication device 100, data is received by, or created on, the mobile communication device 100. Upon creation or receipt, the microprocessor 128 may associate the data with a service identifier. For example, if the data is deemed to be corporate, the data may be tagged with a service identifier that identifies the corporate nature of the data. The service identifier allows the mobile communication device 100 to control the manner in which the data may leave the mobile communication device 100. For one example, when data is received in a corporate e-mail message, the data may simply comprise text in the body of the e-mail message. The e-mail message may be stored in memory 116, 118 on the mobile communication device 100 associated with service identifier. Since the data has been received in a corporate e-mail message, the service identifier with which the data is associated may be termed a "corporate service identifier".

Figure 2A:
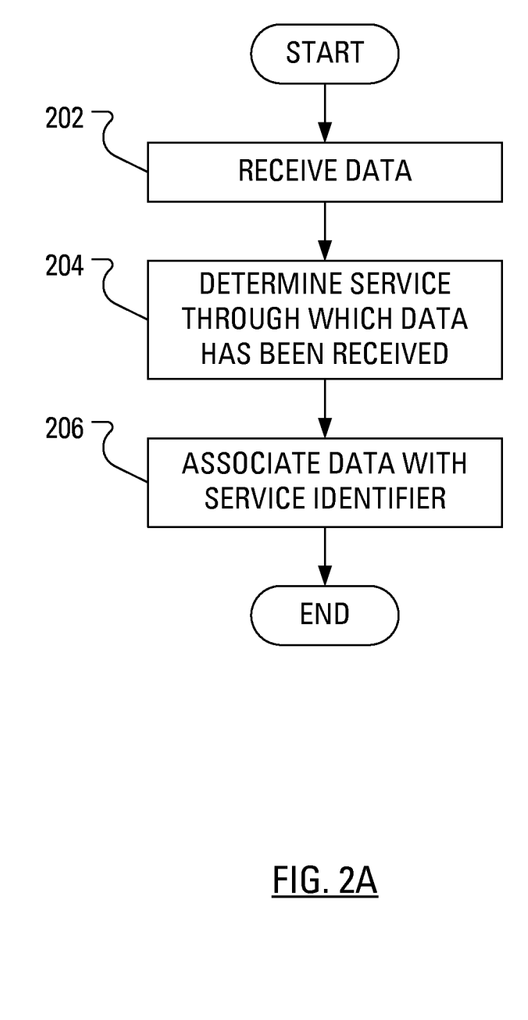
FIG. 2A illustrates example steps in a method of facilitating data protection.

FIG. 2A illustrates example steps in a method of facilitating data protection. Initially, the microprocessor 128 receives (step 202) data from the communication subsystem 102. The data may, for example, comprise an e-mail message with, or without, attachments.

Upon receiving (step 202), at the microprocessor 128, an e-mail message from the communication subsystem 102, the microprocessor 128 may determine (204) the service through which the e-mail message has been received. For one example, the service may be a public, free, advertising-supported e-mail service, such as Gmail™, and the destination e-mail address may be "username@gmail.com". For another example, the service may be a private, corporate e-mail service, and the destination e-mail address may be "username@corporation.com".

Responsive to determining (204) the service through which the e-mail message has been received, the microprocessor 128 may, under control of the data tagging module 130C, associate (step 206) a service identifier with the data. Such associating (step 206) of a service identifier with the data may be considered, colloquially, as "tagging" the data.

An example service identifier may comprise an e-mail address. Accordingly, the microprocessor 128 may associate (step 206) service identifier username@gmail.com with an e-mail message determined (204) to have been received through the Gmail™ service. Similarly, the microprocessor 128 may associate (step 206) service identifier username@corporation.com with an e-mail message determined (204) to have been received through the corporate service.

Another example service identifier may comprise a globally unique identifier associated with a service.

Notably, beyond the reception of an e-mail message, receiving (step 202) data from the communication subsystem 102 may relate to a synchronization of data items managed by the PIM application. For example, a calendar event may be inserted into a user's calendar by another party, such as an assistant, so that data representative of the calendar event may be received (step 202) by the microprocessor 128. Other data items managed by the PIM application that may be synchronized between the mobile communication device 100 and a central server include contact database (address book) entries and memos or notes.

To determine (step 204) that the data is corporate data, the microprocessor 128 may, for example, rely on an indication, received from the communication subsystem 102, of the service through which the data was received.

Figure 2B:
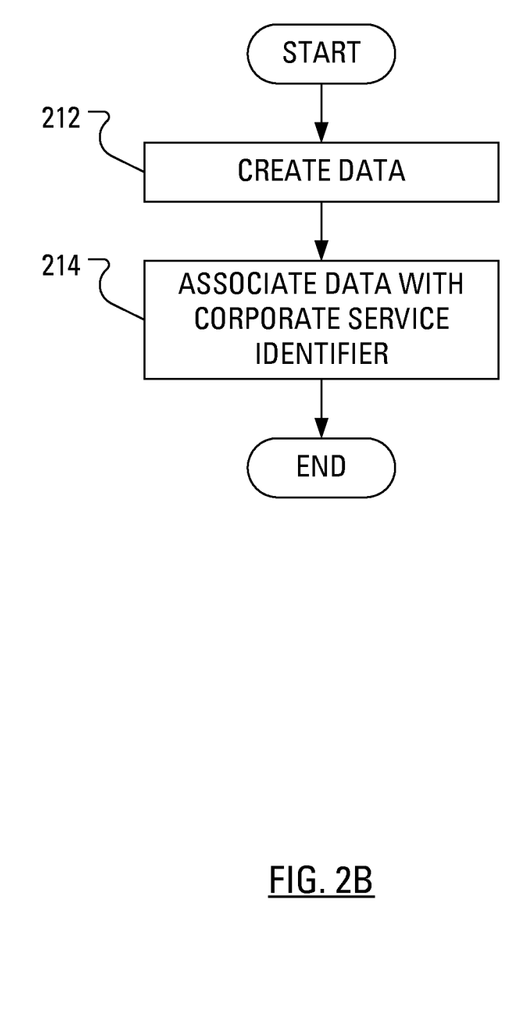
FIG. 2B illustrates example steps in an alternative method of facilitating data protection.

FIG. 2B illustrates example steps in an alternative method of facilitating data protection. Initially, the microprocessor 128 creates (step 212) data. The data may be created, for example, in an application executed on the microprocessor 128 and may be created, for example, responsive to user manipulation of user interface elements of the mobile communication device 100, such as the keyboard 124, the microphone 112 or one or more of the auxiliary I/O devices 106. In the case wherein the application in which the data is created is associated with the corporate service, the microprocessor 128, under the influence of code defining the application, may automatically associate (step 214) a corporate service identifier with the data.

When tagged data is to be included in an e-mail message or calendar event and has the potential to leave the mobile communication device 100, the microprocessor 128 may arrange a presentation, on the display 126, of a prompt that encourages the user to select a secure corporate service to use when transmitting the data.

In an example scenario, an e-mail message may be received over a corporate service and, accordingly, may be tagged as corporate data. A user may select a portion of text in the tagged e-mail message, cause a menu to appear and select a "copy" menu item from the menu, thereby copying the selected text to a software facility that can be used for short-term data storage and/or data transfer between documents or applications. Such a software facility is typically referred to as a "clipboard". For consistency, the text copied to the clipboard may be tagged as corporate data, based on the source of the text copied to the clipboard having been previously tagged as corporate data.

Responsive to the user selecting an insecure and/or non-corporate service to use when transmitting the data, the mobile communication device 100 will prevent the data from leaving the mobile communication device 100. Conversely, if all the data involved is deemed to be non-corporate, then the user is free to choose any delivery mechanism.

Figure 3:
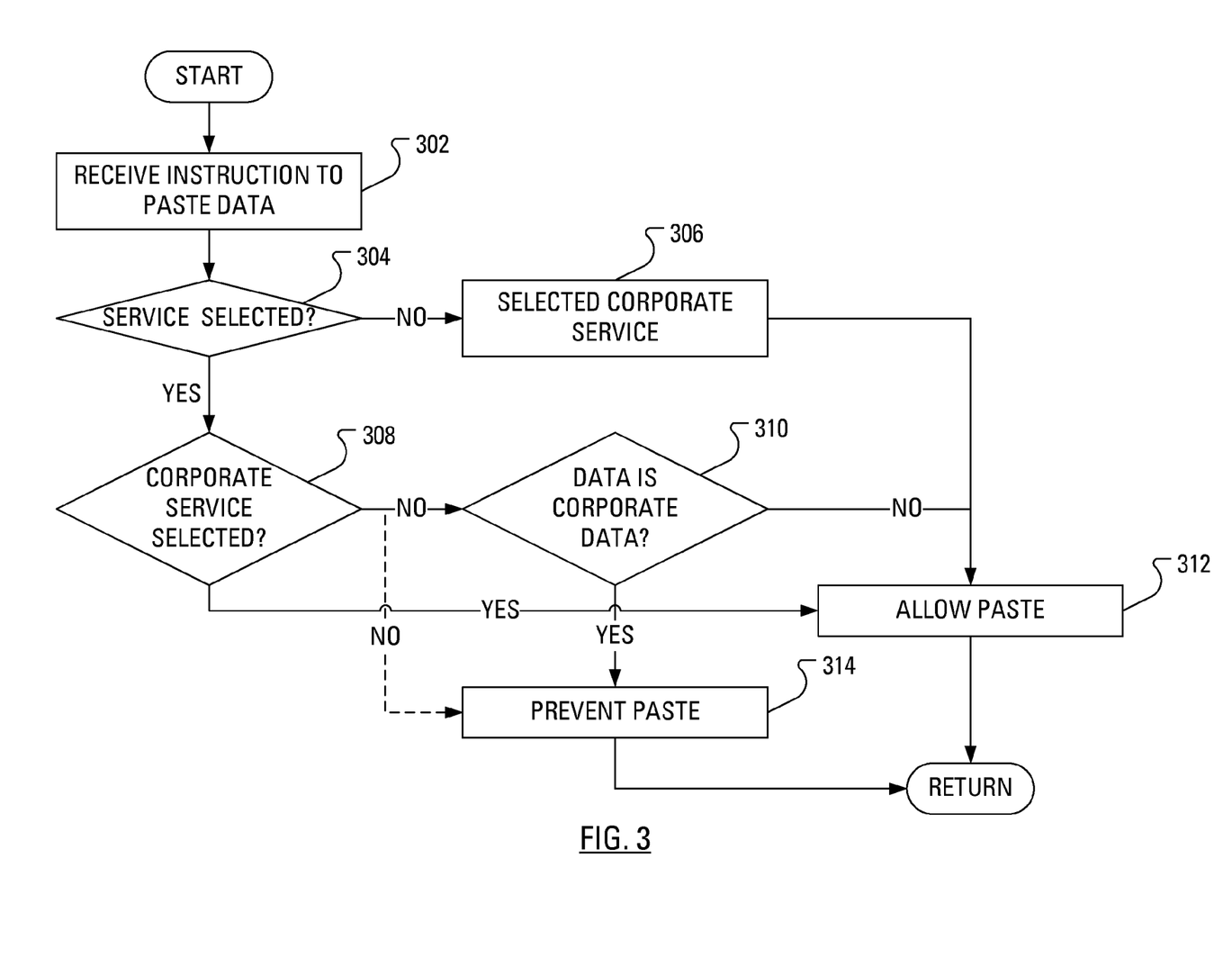
FIG. 3 illustrates example steps in another method of facilitating data protection.

FIG. 3 illustrates example steps in another method of facilitating data protection. Initially, while executing a given application, the microprocessor 128 receives (step 302) an instruction to paste some data into a data item being edited. The data item into which the data is to be pasted may, for example, be an e-mail message, an SMS message, an instant messenger message, a calendar event, an address book entry, etc. The microprocessor 128 then determines (step 304) whether a service has been selected to transmit the data item being edited. Responsive to determining (step 304) that a service has not been selected, the microprocessor 128 may automatically select (step 306) the corporate service and the paste operation may be allowed (step 312) to proceed. More generally, the pasting of data may be allowed after a selection of a corresponding service that is authorized to deliver that data.

Upon determining (step 304) that a service has been selected, the microprocessor 128 then determines (step 308) whether it is the corporate service that has been selected to transmit the data item being edited. Indeed, a given application may be capable of using both a corporate service and a public service, so that determining (step 308) whether the corporate service has been selected may involve determining which of a plurality of services has been tentatively selected for carriage of the data away from the mobile communication device 100.

Upon determining (step 308) that the corporate service has been selected, the paste operation may be allowed (step 312) to proceed.

However, upon determining (step 308) that a service other than the corporate service has been selected, the microprocessor 128 may then determine (step 310) whether the data that is to be pasted is corporate data. One manner in which such a determination may be made is to process the data to examine the service identifier associated therewith. Upon determining (step 310) that the data to be pasted is not corporate data, e.g., determining that the service identifier associated with the data is not a corporate service identifier, the paste operation may be allowed (step 312) to proceed.

Upon determining (step 310) that the data to be pasted is corporate data, e.g., determining that the service identifier associated with the data is a corporate service identifier, the microprocessor 128 may prevent (step 314) the paste operation from proceeding. In conjunction with preventing (step 314) the paste operation from proceeding, the microprocessor 128 may arrange for presentation, on the display 126, of a dialog box.

It may be that determining (step 308) that a service other than the corporate service has been selected for transmission of a data item into which data is to be pasted, involves determining that the application is only capable of transmission using a non-corporate service. That is, determining that the application is a non-corporate application. In such a case, where it is determined that the application is a non-corporate application, the microprocessor 128 may not need to determine (step 310) whether the data that is to be pasted is corporate data before preventing (step 314) the paste operation from proceeding. That is, upon determining that the application is a non-corporate application, the microprocessor 128 may simply prevent (step 314) the paste operation from proceeding, as shown in a dashed line in FIG. 3.

Figure 4:
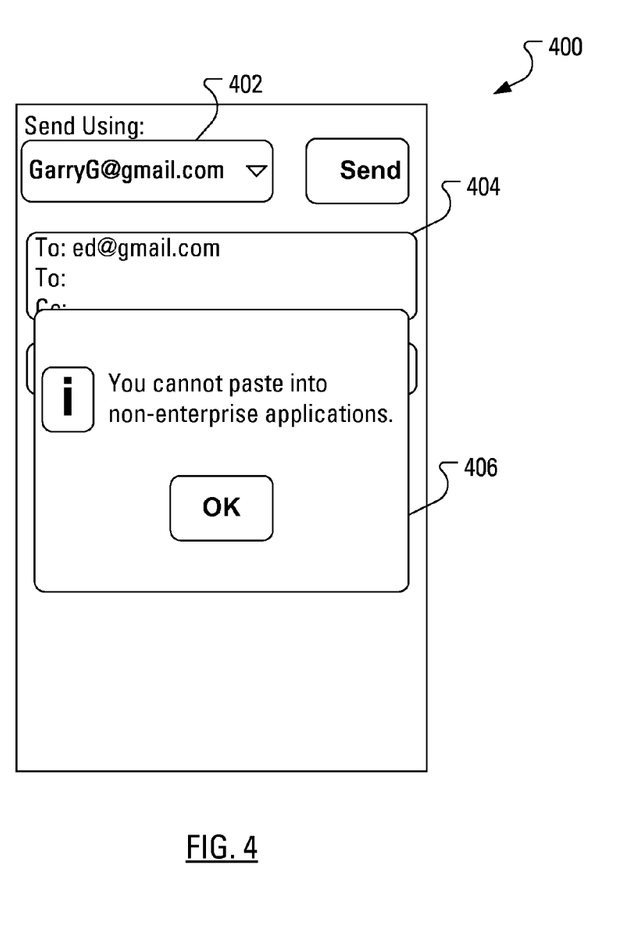
FIG. 4 illustrates a message composition screen such as may be presented on a display of the mobile communication device of FIG. 1.

In the art of user interfaces, the use of a dialog box to provide information to a user is well known. FIG. 4 illustrates a message composition screen 400. The message composition screen 400 includes a From drop down menu 402 for specifying a "From" address. As a consequence of selecting a "From" address using the From drop down menu 402, a user effectively selects a service for use when transmitting the message being composed in the message composition screen 400. The message composition screen 400 also includes an addressing region 404. The addressing region 404 includes one or more fields in which the user may specify a recipient address for the message being composed in the message composition screen 400. Overlaying the message composition screen 400 in FIG. 4 is a dialog box 406.

Although the dialog box 406 carries a message that reads "You cannot paste into non-enterprise applications.", other messages may be equally valid. For example, the message presented in the dialog box may comprise a prompt that encourages the user to select a secure corporate service to use when transmitting the data. Notably, such a prompt does not prevent accidental leakage of corporate data. However, if a leakage of corporate data occurs using transmission over a secure corporate service, such a leakage may be more readily traced.

To stop a user from circumventing the method whose steps are presented in FIG. 3 from selecting a corporate service, pasting, into a data item being edited, data that is associated with a corporate service identifier and then changing the service to a public service before arranging transmission of the data item being edited, a secondary check may be put in place.

Figure 5:
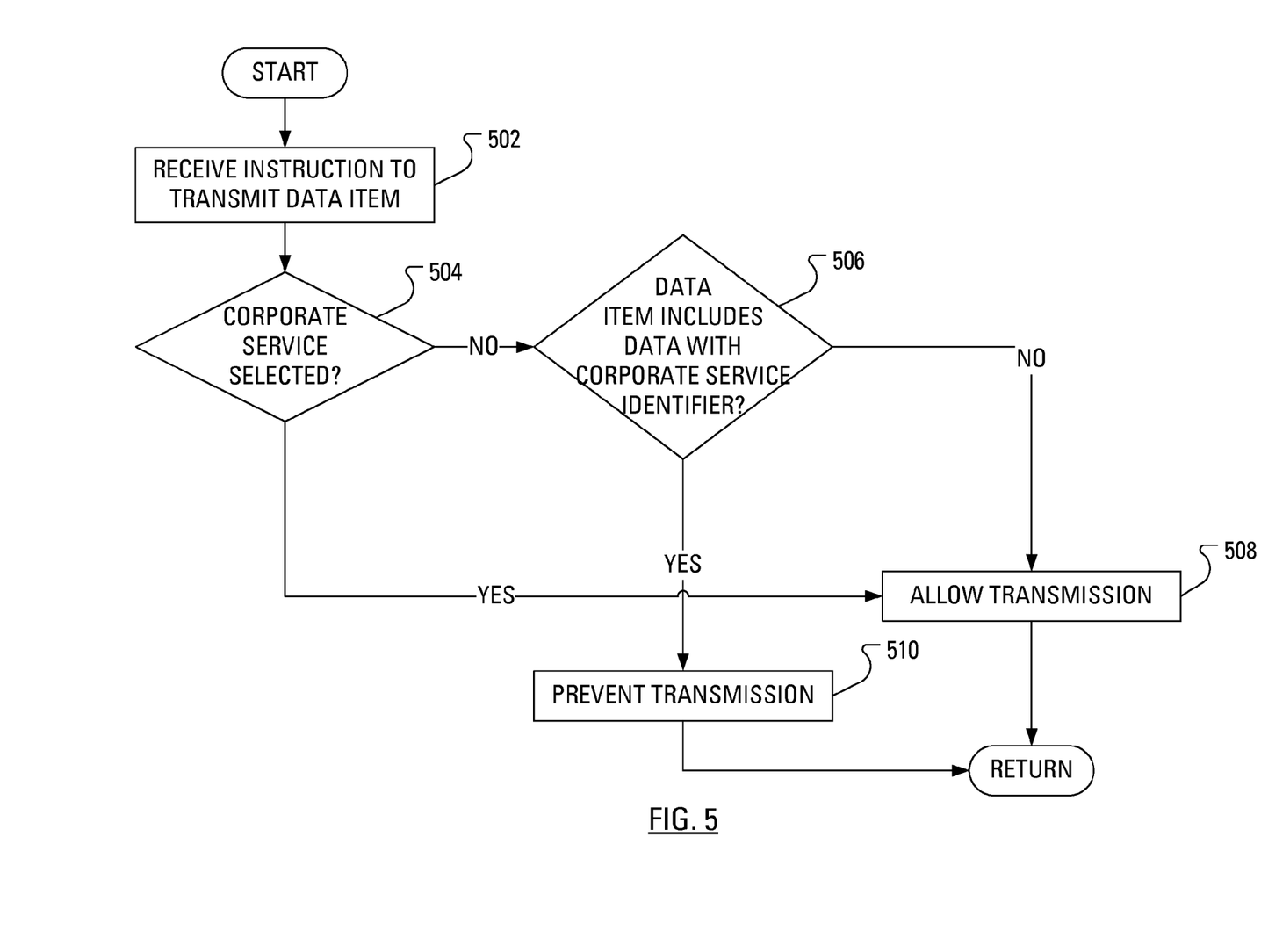
FIG. 5 illustrates example steps in another method of facilitating data protection.

FIG. 5 illustrates example steps in another method of facilitating data protection. Initially, while executing a given application, the microprocessor 128 receives (502) an instruction to transmit a data item being edited. The data item to be transmitted may, for example, be an e-mail message, an SMS message, an instant messenger message, a calendar event, an address book entry, etc. The microprocessor 128 then determines (504) whether the corporate service has been selected to transmit the data item being edited. Indeed, a given application may be capable of using both a corporate service and a public service, so that determining (504) whether the corporate service has been selected may involve determining which of a plurality of services has been selected for carriage of the data away from the mobile communication device 100.

Upon determining (504) that the corporate service has been selected, the transmit operation may be allowed (step 508) to proceed.

However, upon determining (504) that a service other than the corporate service has been selected, the microprocessor 128 may then determine (506) whether the data item that is to be transmitted includes corporate data. One manner in which such a determination may be made is to process the data to examine the service identifier associated therewith, as described hereinbefore. Upon determining (504) that the data item to be transmitted does not include corporate data, e.g., determining that the service identifiers associated with the data item or data included in the data item are not corporate service identifiers, the transmit operation may be allowed (step 508) to proceed.

Upon determining (506) that at least some of the data to be transmitted is corporate data, e.g., determining that a service identifier associated with at least some of the data is a corporate service identifier, the microprocessor 128 may prevent (step 510) the transmit operation from proceeding. In conjunction with preventing (step 510) the paste operation from proceeding, the microprocessor 128 may arrange for presentation, on the display 126, of a dialog box, as discussed hereinbefore in conjunction with prevention of a pasting operation.

Conveniently, the mobile communication device 100 can continue to be used for personal purposes while providing the corporation a manner in which a likelihood of accidental leakage of corporate data may be greatly reduced.

While the foregoing example contemplates an attempt to paste tagged data into an outgoing e-mail message, as person of ordinary skill in the art will recognize that the prevention (step 310) of a paste operation or prevention (step 510) of a transmit operation may equally apply to other outgoing transmissions. For example, a user may manipulate the user interface of the mobile communication device 100 to initiate the execution of a calendar operation and may then create a calendar event. In conjunction with creating the calendar event, the user may specify one or more invitees and may specify a service over which to transmit an invitation to the calendar event. The user may be prevented from pasting data into the calendar event in a case wherein the data is associated with a corporate service identifier and the service that is to be used to transmit the invitation is not a corporate service.

Creation of data may involve various aspects of hardware included in the mobile communication device 100. For example, where the mobile communication device 100 include a camera (not shown), creation of data on the mobile communication device 100 may involve capturing a still photograph or a video. Similarly, creation of data on the mobile communication device 100 may involve capturing a sound recording using the microphone 112. By default, such created data may be tagged as corporate and, accordingly, be subject to the same restrictions to which received data is subject. Alternatively, Global Positioning System (GPS) hardware (not shown) on the mobile communication device 100 may be active while data is being created on the mobile communication device 100 and created data may only be tagged with a corporate service identifier when the data is created within one or more pre-defined geographic boundaries.

A forwarding operation performed on a received e-mail message may be considered similar to a paste operation. Indeed, though not specifically directed by a user, data from the received e-mail message may be copied to a clipboard and pasted into a new outgoing message when a user indicates a request to forward the received e-mail message. In the case wherein the received e-mail message has been received over the corporate service, the e-mail application handling the request to forward the received e-mail message may default the service for the new outgoing message to the corporate service. However, as illustrated in FIG. 4, the user may employ the From drop down menu 402 to select an alternative service. Responsive to such a selection, the microprocessor 128 may prevent (step 310) composition and transmission of the new outgoing message from proceeding. The microprocessor 128 may accomplish such preventing (step 310) by overlaying the message composition screen with a dialog box similar to the dialog box 406 of FIG. 4.

The above-described implementations of the present application are intended to be examples only. Alterations, modifications and variations may be effected to the particular implementations by those skilled in the art without departing from the scope of the application, which is defined by the claims appended hereto.

What is claimed is:

1. A method of facilitating data protection on a mobile communications device, said method comprising:
   receiving an instruction to paste data into an e-mail message;
   determining that a first service has been selected for transmission of said e-mail message;
   determining that said data is associated with a second service;
   preventing pasting of said data into said e-mail message; and
   controlling a display to present a dialog indicating that pasting of said data into said e-mail message has been prevented.

2. The method of claim 1 further comprising determining that said data is associated with said second service by determining that said data is associated with an identifier of said second service.

3. The method of claim 2 wherein said identifier of said second service comprises a globally unique identifier.

4. The method of claim 3 wherein said identifier of said second service comprises an e-mail address.

5. The method of claim 1 wherein said first service comprises an e-mail service.

6. The method of claim 1 wherein said determining that said first service has been selected for transmission of said e-mail message comprises determining that said second service is unavailable to be selected for transmission of said e-mail message.

7. The method of claim 1 wherein said determining that said first service has been selected for transmission of said e-mail message comprises determining that a service has been selected for transmission of said e-mail message.

8. A mobile communication device comprising:
   a communication subsystem;
   a display;
   a processing device adapted to:
      receive an instruction to paste data into an e-mail message;
      determine that a first service has been selected for transmission of said e-mail message using said communication subsystem;
      determine that said data is associated with a second service;
      prevent pasting of said data into said e-mail message; and
      control said display to present a dialog indicating that pasting of said data into said e-mail message has been prevented.

9. A non-transitory computer-readable medium containing computer-executable instructions that, when performed by a processor, cause said processor to:
   receive an instruction to paste data into an e-mail message;
   determine that a first service has been selected for transmission of said e-mail message;
   determine that said data is associated with a second service;
   prevent pasting of said data into said e-mail message; and
   control a display to present a dialog indicating that pasting of said data into said e-mail message has been prevented.

* * * * *